(12) United States Patent
Xue et al.

(10) Patent No.: US 11,734,841 B2
(45) Date of Patent: Aug. 22, 2023

(54) EYE METHOD FOR TRACKING EYE GAZE, SYSTEM, PROCESSING DEVICE AND COMPUTER READABLE STORAGE MEDIUM

(71) Applicants: BEIJING BOE OPTOELECTRONICS TECHNOLOGY CO., LTD., Beijing (CN); BOE Technology Group Co., Ltd., Beijing (CN)

(72) Inventors: Yachong Xue, Beijing (CN); Hao Zhang, Beijing (CN); Lili Chen, Beijing (CN); Jiankang Sun, Beijing (CN); Guixin Yan, Beijing (CN); Xiaolei Liu, Beijing (CN); Yaoyu Lv, Beijing (CN); Menglei Zhang, Beijing (CN); Xinkai Li, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 232 days.

(21) Appl. No.: 17/349,952

(22) Filed: Jun. 17, 2021

(65) Prior Publication Data
US 2022/0164966 A1 May 26, 2022

(30) Foreign Application Priority Data
Nov. 24, 2020 (CN) .......................... 202011331371.X

(51) Int. Cl.
*G06T 7/292* (2017.01)
*G06F 3/01* (2006.01)
(Continued)

(52) U.S. Cl.
CPC .............. *G06T 7/292* (2017.01); *G06F 3/013* (2013.01); *G06T 3/40* (2013.01); *G06T 7/73* (2017.01);
(Continued)

(58) Field of Classification Search
CPC .......... H04N 23/90; G06F 3/013; G06T 73/40
See application file for complete search history.

(56) References Cited

U.S. PATENT DOCUMENTS

2016/0202757 A1* 7/2016 Miao ..................... H04N 23/611
348/78
2018/0081434 A1* 3/2018 Siddiqui ................ G06V 40/20

* cited by examiner

*Primary Examiner* — Edward Park
(74) *Attorney, Agent, or Firm* — Ling Wu; Stephen Yang; Ling and Yang Intellectual Property

(57) ABSTRACT

A method for tracking eye gaze, a system, a processing device and a computer readable storage medium are provided. The method includes: acquiring original images acquired by multiple image acquisition devices, splicing the multiple original images into a spliced image, and determining a responsible region of each image acquisition device in the spliced image; performing preliminary face locating on the spliced image, and determining one or more original images corresponding to a preliminarily located face position according to the preliminarily located face position and the responsible region; and performing secondary face locating on the one or more determined original images to obtain face pose information and a positional relation of pupils with respect to human eyes, and calculating coordinates of gaze points of the human eyes according to the obtained face pose information and the positional relation of the pupils with respect to the human eyes.

20 Claims, 9 Drawing Sheets

(51) Int. Cl.
*G06T 7/73* (2017.01)
*G06T 3/40* (2006.01)
*G06V 40/19* (2022.01)
*G06V 40/16* (2022.01)
*H04N 23/90* (2023.01)

(52) U.S. Cl.
CPC ............ *G06V 40/161* (2022.01); *G06V 40/19* (2022.01); *H04N 23/90* (2023.01); *G06T 2207/20212* (2013.01); *G06T 2207/30201* (2013.01)

EYE METHOD FOR TRACKING EYE GAZE, SYSTEM, PROCESSING DEVICE AND COMPUTER READABLE STORAGE MEDIUM

CROSS-REFERENCE TO RELATED APPLICATION

The present application claims priority of Chinese Patent Application No. 202011331371.X, filed to the CNIPA on Nov. 24, 2020, the content of which is hereby incorporated by reference.

TECHNICAL FIELD

Embodiments of the present disclosure relate to, but are not limited to, the technical field of intelligent display, in particular to a method for tracking eye gaze, a system, a processing device and computer readable storage medium.

BACKGROUND

With the continuous development of Virtual Reality (VR)/Augmented Reality (AR) technology, people have higher and higher demands on interactive modes, in which non-invasive gaze tracking systems have become a research hotspot.

Nowadays, in a calculation process of a user's eye gaze, there are the following drawbacks in gaze tracking for multi-person on large-size display screens.

First, large and medium-sized display screens have higher requirements on the Field angle of View (FOV) of the camera.

Second, under a certain resolution, a higher camera field angle of view will impact the calculation accuracy.

Third, simultaneous gaze tracking for multi-person will occupy higher computing resources.

In addition, spatial gaze tracking systems currently on the market are often suitable for small-sized display screens only and are for one single user, which requires calibration in advance during use, and the accuracy will drop greatly when a human head moves and rotates.

SUMMARY

The following is a summary of subject matters described in detail in the present disclosure. This summary is not intended to limit the protection scope of the claims.

An embodiment of the present disclosure provides a method for tracking eye gaze, which includes the following steps: acquiring original images acquired by multiple image acquisition devices, splicing the acquired plurality of original images into one spliced image, and determining a responsible region of each image acquisition device in the spliced image; performing preliminary face locating on the spliced image, and determining one or more original images corresponding to a preliminarily located face position according to the preliminarily located face position and the responsible region of each image acquisition device in the spliced image; performing secondary face locating on the one or more determined original images to obtain face pose information and a positional relation of a pupil with respect to a human eye, and calculating coordinates of a gaze point of the human eye according to the obtained face pose information and the positional relation of the pupil with respect to the human eye.

In an exemplary embodiment, splicing the acquired multiple original images into the one spliced image includes: acquiring a center coordinate, a transverse field angle of view, a longitudinal field angle of view and a resolution of each image acquisition device; determining a target region acquired by each image acquisition device according to the center coordinate, the transverse field angle of view and the longitudinal field angle of view of each image acquisition device; determining a non-overlapping region in the target regions acquired by adjacent image acquisition devices according to a target region acquired by each image acquisition device; taking one of the adjacent image acquisition devices as a main acquisition device and the other image acquisition device as an auxiliary acquisition device, converting a non-overlapping region in a target region acquired by the auxiliary acquisition device into a non-overlapping region in an image acquired by the auxiliary acquisition device according to the resolution of each image acquisition device; and splicing the non-overlapping region in the image acquired by each auxiliary acquisition device onto the image acquired by each main acquisition device to obtain a spliced image.

In an exemplary embodiment, taking one of the adjacent image acquisition devices as the main acquisition device and the other image acquisition device as the auxiliary acquisition device includes: when two adjacent image acquisition devices are in a left and right distribution, an image acquisition device on the left is the main acquisition device and an image acquisition device on the right is the auxiliary acquisition device; when the two adjacent image acquisition devices are in an up and down distribution, an upper image acquisition device is the main acquisition device and a lower image acquisition device is the auxiliary acquisition device.

In an exemplary embodiment, after the step of splicing of the acquired multiple original images into the spliced image and before the step of determining the responsible region of each image acquisition device in the spliced image, the method further includes: performing noise reduction and downsampling on the spliced image.

In an exemplary embodiment, performing the downsampling on the spliced image includes: uniformly dividing the spliced image into multiple sub-regions according to a resolution of a target image; calculating the quantity of pixels contained in each sub-region and center coordinates of each sub-region; calculating a comprehensive pixel value of each sub-region according to distances from all pixels of each sub-region to a center of the sub-region; and assigning the calculated comprehensive pixel value of each sub-region to the spliced image to obtain a downsampled spliced image.

In an exemplary embodiment, uniformly dividing the spliced image into the multiple sub-regions according to the resolution of the target image includes: uniformly dividing the spliced image into $a*b$ sub-regions, wherein a width of each sub-region is $M/a$ and a height of each sub-region is $N/b$, wherein a, b, M and N are positive integers, $M>a$, $N>b$; $a*b$ is the resolution of the target image, and $M*N$ is a resolution of the spliced image.

In an exemplary embodiment, determining the responsible region of each image acquisition device in the spliced image includes: acquiring a target region acquired by each image acquisition device; determining a dividing line of target regions acquired by adjacent image acquisition devices according to a distribution position of each image acquisition device; acquiring an acquisition range of each image acquisition device according to the dividing line of the target regions acquired by the adjacent image acquisition devices; and determining the responsible region of each image acquisition device in the spliced image is according to the acquisition range of each image acquisition device.

In an exemplary embodiment, performing the secondary face locating on the one or more determined original images to obtain the face pose information and the positional relation of the pupil with respect to the human eye, and calculating the coordinates of the gaze point of the human eye according to the obtained face pose information and the positional relation of the pupil with respect to the human eye includes: performing face detection in the one or more determined original images to obtain a face region; performing facial landmark detection on the face region to obtain a center of a human eye region; solving a pose of a face in space to obtain a direction vector of the face, wherein the pose includes position coordinates and angle coordinates; locating the pupil, calculating a movement difference between the pupil and the center of the human eye region, and obtaining a direction vector of the pupil with respect to the face according to the calculated movement difference, the direction vector of the face and a diameter of human eyeball; converting the direction vector of the pupil with respect to the face into a direction vector of the pupil in a world coordinate system; and calculating the coordinates of the gaze point of the pupil on a screen according to the direction vector of the pupil in the world coordinate system.

In an exemplary embodiment, the method further includes: calculating an average value of gaze point coordinates of the left eye and gaze point coordinates of the right eye to obtain final gaze point coordinates.

An embodiment of the present disclosure further provides a processing device including a processor and a memory storing a computer program that is runnable on the processor, wherein any one of the aforementioned method for tracking eye gaze is implemented when the program is executed by the processor.

An embodiment of the disclosure further provides a gaze tracking system, which includes multiple image acquisition devices and any one of the aforementioned processing device.

An embodiment of the present disclosure further provides a computer readable storage medium storing executable instructions. When the executable instructions are executed by a processor, the method for tracking eye gaze as described in any one of the above is implemented.

Other features and advantages of the present disclosure will be set forth in the following specification, and will become apparent partially from the specification, or be understood by practice of the present disclosure. Other advantages of the present disclosure may be realized and obtained by the solutions described in the specification and drawings.

Other aspects will become apparent upon reading and understanding accompanying drawings and the detailed description.

BRIEF DESCRIPTION OF DRAWINGS

Accompanying drawings are used to provide an understanding of technical solutions of the present disclosure and form a part of the specification. Together with embodiments of the present disclosure, they are used to explain the technical solutions of the present disclosure and do not constitute a limitation on the technical solutions of the present disclosure.

DETAILED DESCRIPTION

Specific implementations of the present disclosure will be described further in detail below with reference to the accompanying drawings and embodiments. The following embodiments serve to illustrate the present disclosure, but are not intended to limit the scope of the present disclosure. The embodiments and features in the embodiments in the present disclosure may be combined randomly with each other if there is no conflict.

An embodiment of the disclosure provides a method for tracking eye gaze, in which images in a front region of a screen are acquired by multiple image acquisition devices. Then, a distributive self-adaptive face detection technology is used to obtain approximate region information of a face in front of the screen to preliminarily locate the face. Next, according to position information of the face on the image, a secondary face locating on the corresponding camera image is performed to obtain accurate face pose information. Lastly, coordinates of gaze points of the human eyes on the screen are calculated according to the obtained face pose information in combination with the current positional relation of the pupils with respect to human eyes. The method for tracking eye gaze according to the embodiment of the present disclosure is suitable for display screens of any size, and can simultaneously track the eye gazes of a single person or multiple people, thus solving the problem with most of the spatial gaze tracking devices in the current market which have small tracking field of view and suitable for a single person. Through the distributive self-adaptive face detection, in the embodiment of the present disclosure, the calculation accuracy is improved while effectively reducing the calculation complexity, and the problem of high occupancy rate of face detection resources with multiple cameras is solved. In addition, in the embodiment of the disclosure, influence of face poses is incorporated into the gaze tracking during calculation of eye gazes, which improves the calculation accuracy when a face is moving or deflecting, solving the problem of large reduction of accuracy when a face pose changes. Moreover, the method provided by the embodiment of the disclosure does not require a calibration in advance, which makes it more convenient to use.

Figure 1:
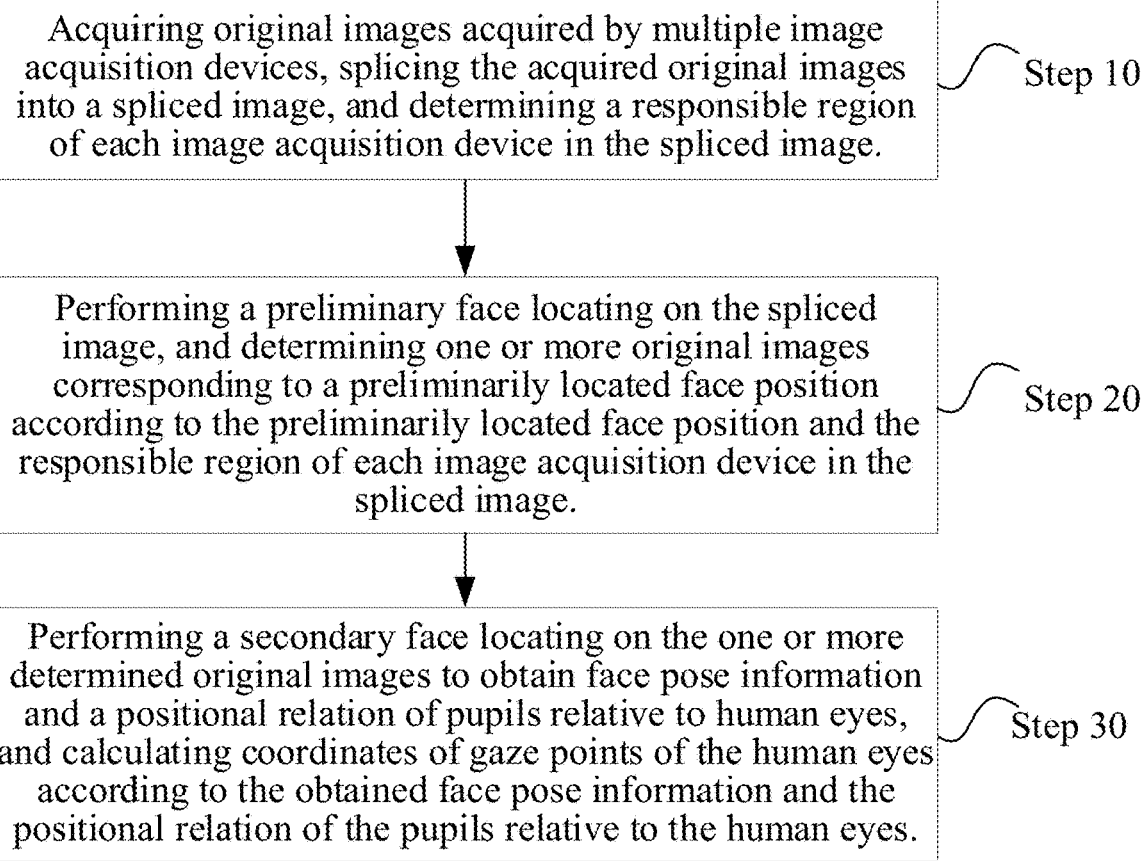
FIG. 1 is a schematic flowchart of a method for tracking eye gaze according to an embodiment of the present disclosure.

As shown in FIG. 1, an embodiment of the present disclosure provides a method for tracking eye gaze, which includes steps 10 to 30.

Step 10: acquiring original images acquired by multiple image acquisition devices, splicing the acquired multiple original images into a spliced image, and determining a responsible region of each image acquisition device in the spliced image.

Figure 2:
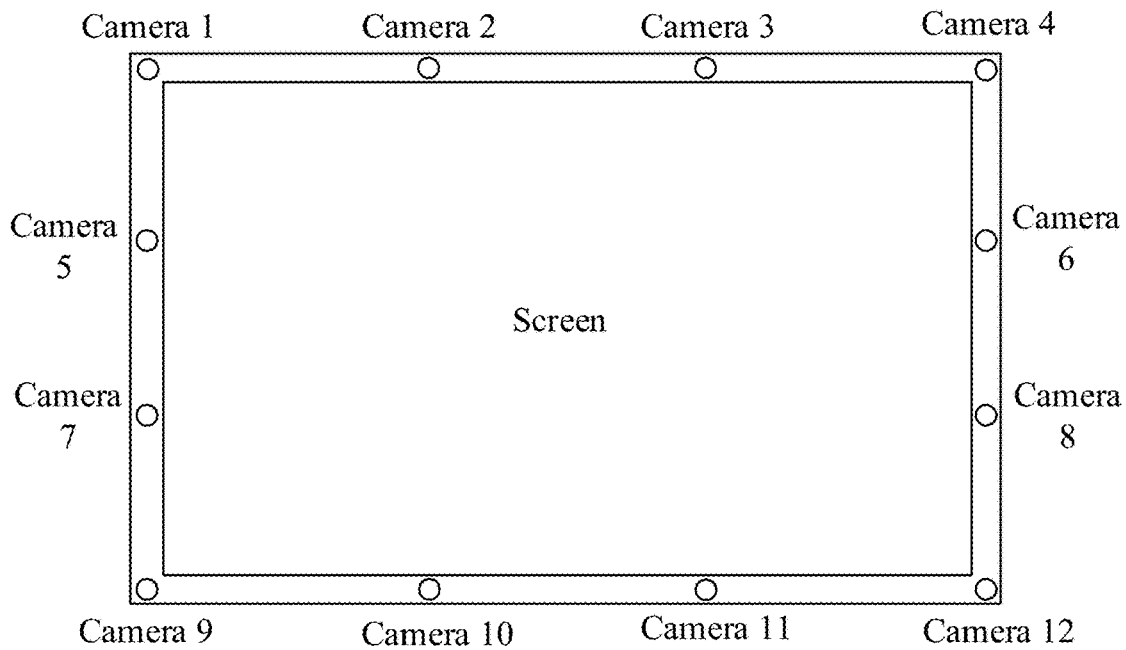
FIG. 2 is a schematic diagram of arrangement positions of multiple image acquisition devices according to an embodiment of the present disclosure.

In an exemplary embodiment, as shown in FIG. 2, multiple image acquisition devices are disposed at intervals around a screen region gazed by human eyes.

In an exemplary embodiment, shape of the screen region is rectangular, circular, elliptical or the like.

In an exemplary embodiment, an image acquisition device is a camera or any other type of image acquisition device, which is used to acquire images of the region in front of the screen. Illustratively, the camera may be a red, green and blue (RGB) camera.

Figure 3:
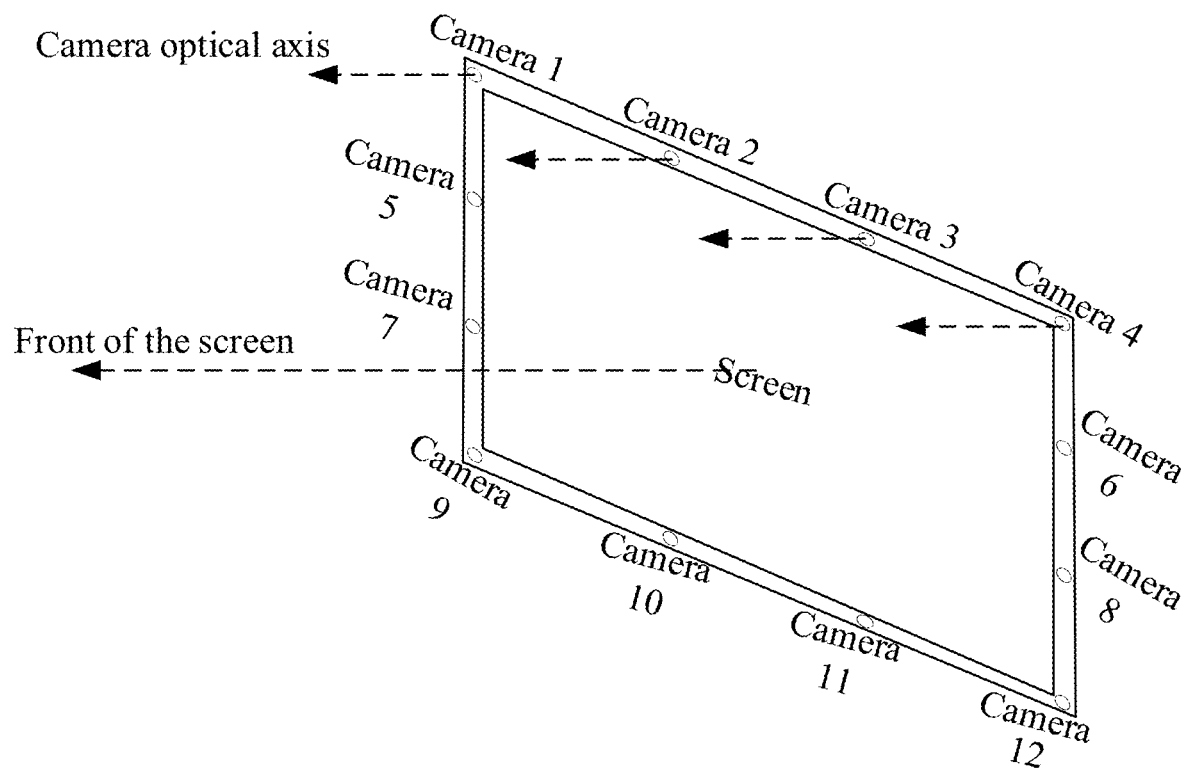
FIG. 3 is a schematic diagram of optical axis directions of the multiple image acquisition devices shown in FIG. 2.

In an exemplary embodiment, as shown in FIG. 2, 12 cameras are used, and each camera has a Field Angle of View (FOV) of 75 degrees, and a front region at 60 degrees horizontally and 45 degrees longitudinally with respect to the camera is photographed. Each camera have a resolution of 640*480, and a frame rate of 30 frames per second (FPS). As shown in FIG. 3, optical axes of all the cameras are parallel to a perpendicular bisector of the screen.

In an exemplary embodiment, when a width and a height of the screen region is set as W*H, distribution parameters of the multiple cameras are as follows: a distance between horizontally adjacent cameras is W/3, and a distance between vertically adjacent cameras is H/3; a distance from a junction of the shooting regions of the multiple cameras to the screen region is a nearest use distance L of the gaze tracking system, and the calculation method of the nearest use distance L of the gaze tracking system is as follows:

for a transverse nearest use distance Lw or a longitudinal nearest use distance Lh, the requirements are: at this distance, there is an overlap just between the shooting ranges of the cameras, and since a transverse shooting region of a camera can be regarded as a transverse sector region, shooting regions of two adjacent cameras will not overlap when the distance therebetween smaller than a certain value, then the transverse nearest use distance Lw or the longitudinal nearest use distance Lh can be obtained according to trigonometric function.

Figure 4:
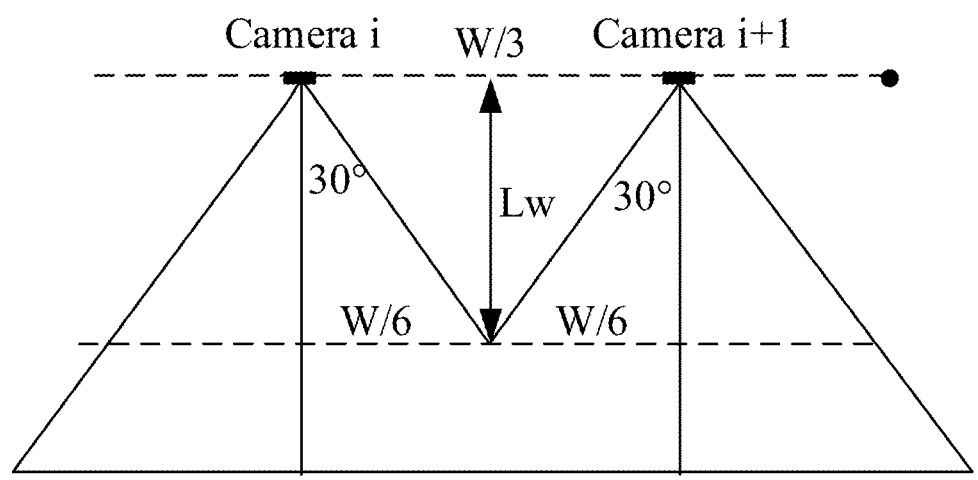
FIG. 4 is a schematic diagram of a calculation principle of a transverse nearest use distance of the system shown in FIG. 2.

As shown in FIG. 4, given that a distance between two adjacent cameras is W/3 and a transverse FOV of the cameras is 60°, so a transverse nearest use distance Lw is:

$$Lw = \frac{W}{3*2} * \sqrt{3};$$

In the same way, a longitudinal nearest use distance Lh is calculated according to the following formula:

$$Lh = \frac{H}{3*2} * 2.4;$$

The nearest use distance L takes the maximum value of the transverse nearest use distance Lw and the longitudinal nearest use distance Lh.

Figure 5:
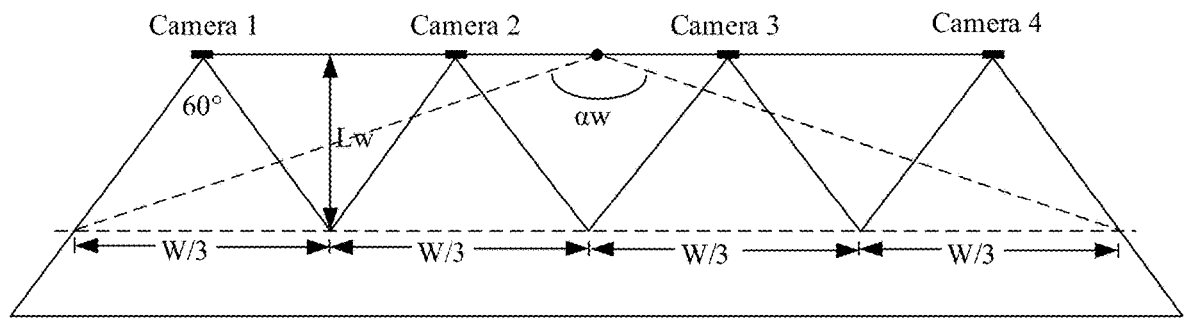
FIG. 5 is a schematic diagram of a calculation principle of a transverse field angle of view of the system shown in FIG. 2.
Figure 6:
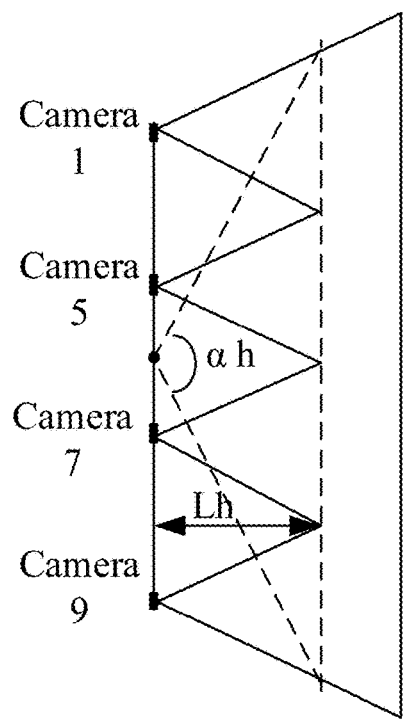
FIG. 6 is a schematic diagram of a calculation principle of a longitudinal field angle of view of the system shown in FIG. 2.

At the nearest use distance L, a transverse shooting range of all the cameras and a longitudinal shooting range of all the cameras are calculated, and a transverse field angle of view aw and a longitudinal field angle of view ah of the gaze tracking system can be obtained according to trigonometric function and inverse trigonometric function. Exemplarily, taking the camera matrix shown in FIG. 2 as an example, as shown in FIGS. 5 and 6, the field angle of view of the multiple cameras at the nearest use distance L are calculated as follows:

the transverse field angle of view αw is:

$$\alpha w = 2 * \arctan\left(\frac{2W}{3Lw}\right);$$

the longitudinal field angle of view αh is:

$$\alpha h = 2 * \arctan\left(\frac{2H}{3Lh}\right);$$

The nearest use distance L takes the value of the transverse nearest use distance Lw or the value of the longitudinal nearest use distance Lh, which determines whether the transverse field angle of view aw or the longitudinal field angle of view ah is taken as the reference. If the transverse field angle of view aw is taken as the reference, it means that both the transverse nearest use distance and the longitudinal use distance are Lw. When calculating the longitudinal field angle of view ah, it is necessary to substitute the corresponding transverse nearest use distance Lw into the calculation formula of the longitudinal field angle of view ah again (i.e., replacing Lh in the calculation formula of the longitudinal field angle of view ah with Lw) to obtain the current longitudinal field angle of view ah.

Taking a 75-inch screen as an example, the nearest use distance L of this gaze tracking system is 473 mm, and at the nearest use distance, a corresponding transverse field angle of view aw is 133.2° and a corresponding longitudinal field angle of view ah is 105.8°.

In an exemplary embodiment, splicing the acquired of the multiple original images into one spliced image includes the following steps:

Step 101: acquiring a central coordinate, a transverse field angle of view, a longitudinal field angle of view and a resolution of each image acquisition device;

Step 102: determining vertex coordinates of a target region acquired by each image acquisition device according to the center coordinate, the transverse field angle of view and the longitudinal field angle of view of each image acquisition device;

Step 103: determining vertex coordinates of a non-overlapping region in target regions acquired by adjacent image acquisition devices according to the vertex coordinates of the target region acquired by each image acquisition device;

Step 104: taking one of the adjacent image acquisition devices as a main acquisition device and the other image acquisition device as an auxiliary acquisition device, and converting vertex coordinates of a non-overlapping region in a target region acquired by the auxiliary acquisition device into vertex coordinates of a non-overlapping region in an image acquired by the auxiliary acquisition device to obtain the non-overlapping region in the image acquired by each auxiliary acquisition device according to the resolution of each image acquisition device; and Step 105: splicing the non-overlapping region in the image acquired by each auxiliary acquisition device onto the image acquired by each main acquisition device to obtain a spliced image.

Figure 7:
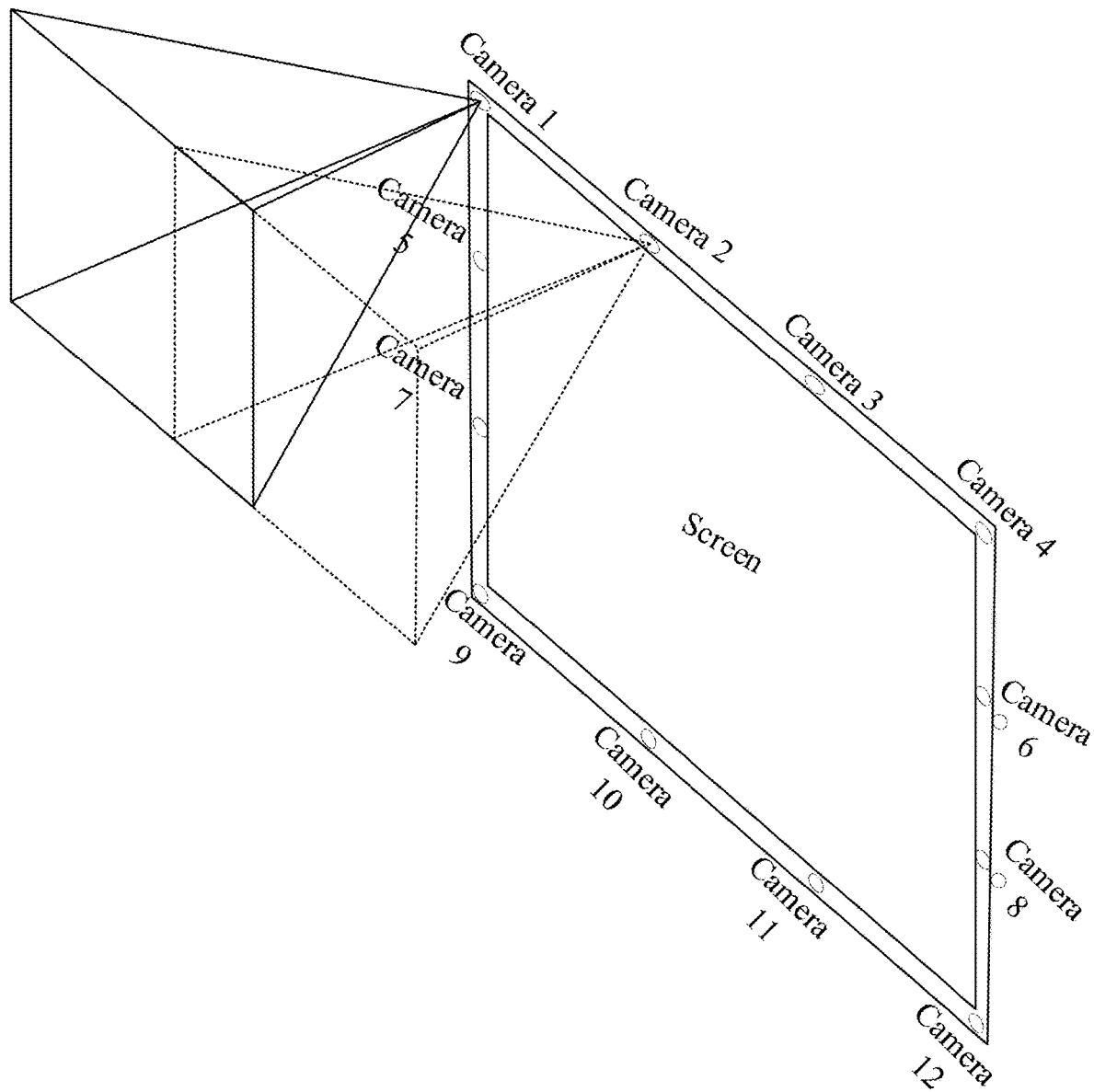
FIG. 7 is a schematic diagram of overlapping regions in shooting regions of adjacent image acquisition devices shown in FIG. 2.

In an exemplary embodiment, as shown in FIG. 7, taking a center coordinates of camera 1 in the upper left corner as an origin point, center coordinates of camera 2 are (W/3, 0), center coordinates of camera 3 are (2 W/3, 0), center coordinates of camera 4 are (W, 0), center coordinates of camera 5 are (0, H/3), a center coordinates of camera 6 are (W, H/3), center coordinates of camera 7 are (0, 2H/3), center coordinates of camera 8 are (W, 2H/3), center coordinates of camera 9 are (0, H), center coordinates of camera 10 are (W/3, H), center coordinates of camera 11 are (2 W/3, H), and center coordinates of camera 12 are (W, H).

Figure 8:
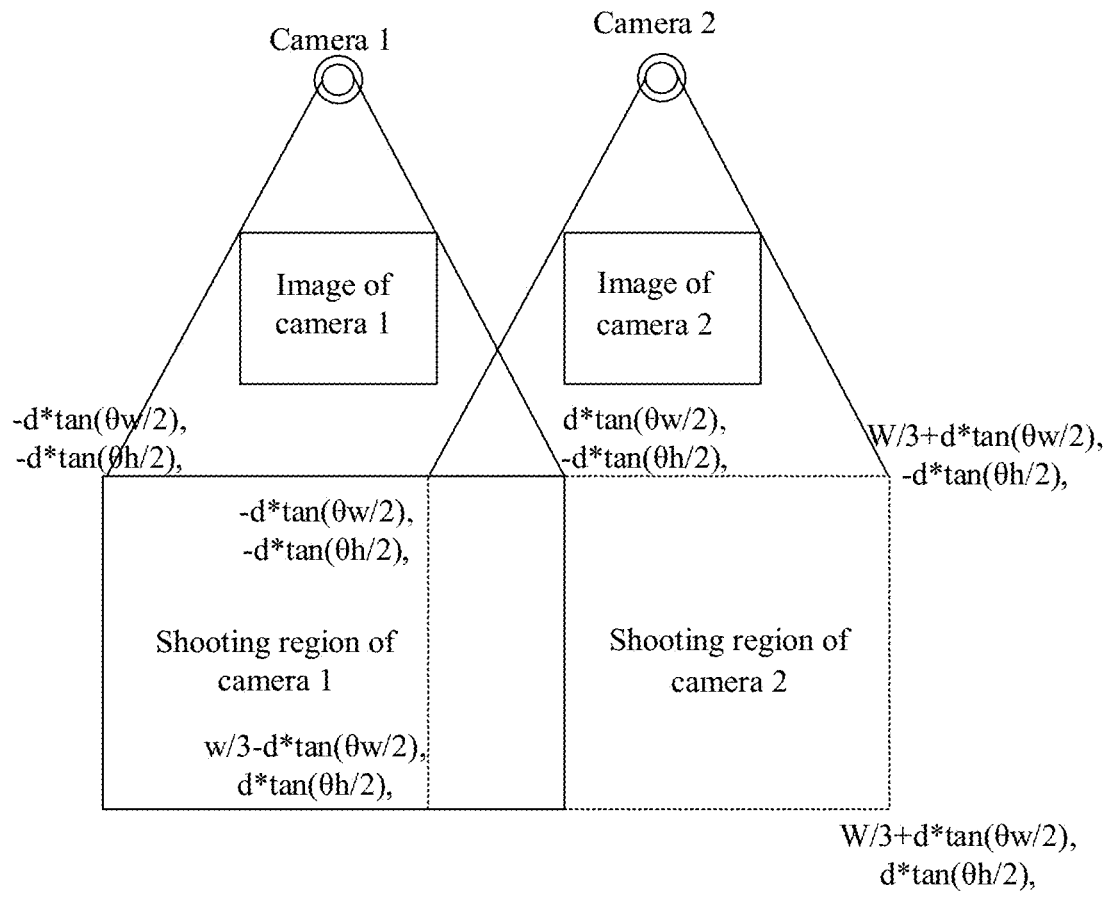
FIG. 8 is a schematic diagram of vertex coordinates of shooting regions of camera 1 and camera 2 shown in FIG. 7.

In an exemplary embodiment, given the shooting regions and shooting distances of cameras 1 and 2, assuming that each camera has a resolution of m*n, a transverse FOV of θw, and a longitudinal FOV of θh, vertex coordinates of the shooting regions of cameras 1 and camera 2 may be obtained according to trigonometric functions. As shown in FIG. 8, at a distance d (distance d>nearest used distance L), four vertex coordinates of the shooting region of camera 1 are: (−d*tan(θw/2), −d*tan(θh/2)), (d*tan(θw/2), −d*tan(θh/2)), (−d*tan(θw/2), d*tan(θh/2)), and (d*tan(θw/2), d*tan(θh/2)). Four vertex coordinates of the region photographed by camera 2 are: (W/3−d*tan(θw/2), −d*tan(θh/2)), (W/3+d*tan(θw/2), −d*tan(θh/2)), (W/3−d*tan(θw/2), d*tan(θh/2)), and (W/3+d*tan(θw/2), d*tan(θh/2)). In the same way, four vertex coordinates of the shooting region of each camera at distance d can be calculated.

In an exemplary embodiment, when two adjacent cameras are in a left and right distribution, a camera on the left is a main camera and a camera on the right is an auxiliary camera; when two adjacent cameras are in an up and down distribution, an upper camera is a main camera and a lower camera is an auxiliary camera. For example, for camera 1 and camera 2, camera 1 is set as the main camera and camera 2 is set as the auxiliary camera. For camera 1 and camera 5, camera 1 is set as the main camera, and camera 5 is set as the auxiliary camera. Similarly, the main-auxiliary relations between other adjacent cameras can be obtained.

In an exemplary embodiment, coordinates of shooting regions of adjacent cameras are compared to obtain vertex coordinates of non-overlapping regions in the shooting regions of the auxiliary cameras. For example, as shown in FIG. 8, for camera 1 and camera 2, four vertex coordinates of the non-overlapping region in the shooting region of camera 2 are (d*tan(θw/2), −d*tan(θh/2)), (W/3+d*tan(θw/2), −d*tan(θh/2)), (d*tan(θw/2), d*tan(θh/2)), and (W/3+d*tan(θw/2), d*tan(θh/2)). In the same way, four vertex coordinates of non-overlapping regions of other adjacent cameras can be obtained.

In an exemplary embodiment, a shooting ratio of the non-overlapping region in the shooting region of the auxiliary camera is calculated and converted into an image to obtain the non-overlapping region in the image acquired by each auxiliary acquisition device.

In an exemplary embodiment, as shown in FIG. 8, by using the mapping relation between the shooting range of the cameras and the obtained image, the non-overlapping region in the shooting region of the auxiliary camera is calculated to be converted into the non-overlapping region in the image photographed by the auxiliary camera by the following formula:

For an upper left vertex of the non-overlapping region, coordinates P1(X1, Y1) mapped to the image are:

$$X1 = \frac{d*\tan\left(\frac{\theta w}{2}\right) - \left(\frac{W}{3} - d*\tan\left(\frac{\theta w}{2}\right)\right)}{\left(\frac{W}{3} + d*\tan\left(\frac{\theta w}{2}\right)\right) - \left(\frac{W}{3} - d*\tan\left(\frac{\theta w}{2}\right)\right)} *m =$$

$$\frac{2*d*\tan\left(\frac{\theta w}{2}\right) - \frac{W}{3}}{2*d*\tan\left(\frac{\theta w}{2}\right)} *m;$$

Since the center coordinates of camera 1 and camera 2 are located on a same horizontal line, Y1=0;

For an upper right vertex of the non-overlapping region, it is mapped to coordinates P2=(m, 0) in the image;

For a bottom left vertex of the non-overlapping region, coordinates P3(X3, Y3) mapped to the image are:

$$X3 = X1 = \frac{2*d*\tan\left(\frac{\theta w}{2}\right) - \frac{W}{3}}{2*d*\tan\left(\frac{\theta w}{2}\right)} *m;$$

$$Y3 = n;$$

For a bottom right vertex of the non-overlapping region, it is mapped to coordinates P4=(m, n) in the image.

Figure 9:
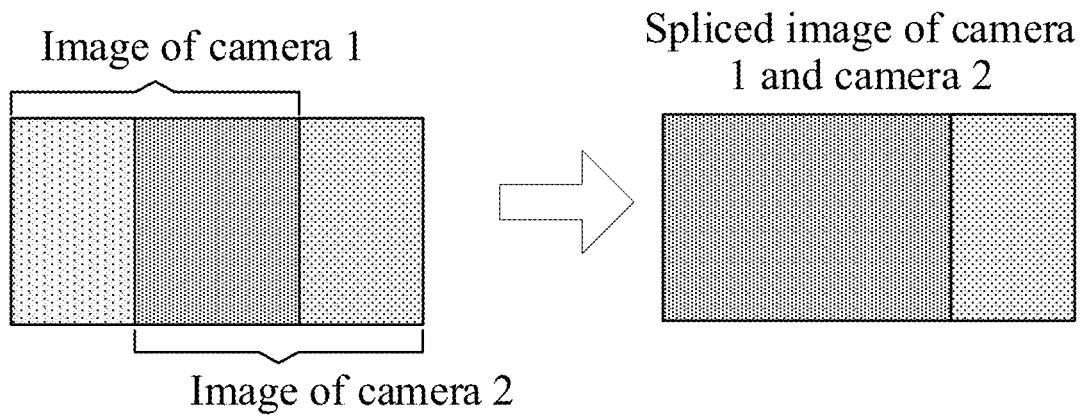
FIG. 9 is a schematic diagram of a spliced result of captured images of the camera 1 and the camera 2 shown in FIG. 7.

In an exemplary embodiment, as shown in FIG. 9, the non-overlapping region mapped to the image of camera 2 is extracted and spliced to the right side of the image photographed by camera 1 to achieve splicing of the images photographed by camera 1 and camera 2. For other cameras, the same method is used for calculation, and an image of a complete region in front of the screen will be finally obtained.

The embodiment of the disclosure provides a spatial gaze tracking method which is suitable for a large field of view, has low resource occupancy rate, high calculation accuracy and speed, and can simultaneously calculate the eye gaze of multiple people. In this method, 12 cameras are used and uniformly distributed around a screen, wherein the 12 cameras are turned on at the same time to capture an image of a front region of the screen to form a large field of view. The captured 12 images are spliced to obtain an image of a complete front region of the screen. The splicing method according to the embodiment has advantages of less time-consuming, low calculation complexity, and less resource occupancy rate.

In an exemplary embodiment, after splicing the acquired multiple original images into one spliced image, the method for tracking eye gaze further includes the following step:

Step 106: performing noise reduction and downsampling on the spliced image.

In an exemplary embodiment, Gauss filtering is used to optimize the spliced image and eliminate noise in the image.

Because a resolution of the target image finally required by the face rough locating part is 640*480, and the resolution of the spliced image is greater than this resolution, it is necessary to downsample the spliced image.

In an exemplary embodiment, performing the downsampling on the spliced image includes the following steps:

Step 1061: uniformly dividing the spliced image into multiple sub-regions according to the resolution of the target image;

Step 1062: calculating the quantity of pixels contained in each sub-region and center coordinates of each sub-region;

Step 1063: calculating a comprehensive pixel value of each sub-region according to distances from all pixels of each sub-region to the center of the sub-region; and Step 1064: assigning the calculated comprehensive pixel value of each sub-region to the spliced image to obtain a downsampled spliced image.

In an exemplary embodiment, uniformly dividing the spliced image into multiple sub-regions according to the resolution of the target image includes:

uniformly dividing the spliced image into a*b sub-regions, wherein a width of each sub-region is M/a and a height of each sub-region is N/b, wherein a, b, M and N are positive integers, M>a, N>b; a*b is the resolution of the target image, and M*N is a resolution of the spliced image.

In an exemplary embodiment, assuming that the resolution of the spliced image is M*N, and given that the resolution of the final required image is 640*480, performing the downsampling on the spliced images includes the following steps:

Step 1061': uniformly dividing the spliced image into 640*480 rectangular regions, wherein each rectangular region has a width*height of (M/640)*(N/480);

Step 1062': sequentially calculating pixels contained in each rectangular region and center coordinates of each rectangular region, and calculating a distance from each pixel Pk (k=1, 2, 3, . . . , s) to a center (xc, yc) of the corresponding rectangular region according to the following formula:

$$dk = \sqrt{(xk-xc)^2 + (yk-yc)^2};$$

Step 1063': calculating a final pixel value P corresponding to each rectangular region according to the following formula:

$$P = \frac{d1*P1 + d2*P2 + \ldots + ds*Ps}{(d1+d2+\ldots+ds)};$$

Step 1064': assigning the final pixel value P corresponding to each rectangular region to the final required image to obtain the downsampled image.

In an exemplary embodiment, determining a responsible region of each image acquisition device in the spliced image includes the following steps:

Step 1065: acquiring vertex coordinates of a target region acquired by each image acquisition device;

Step 1066: determining a dividing line between target regions acquired by adjacent image acquisition devices according to a distribution position of each image acquisition device;

Step 1067: acquiring an acquisition range of each image acquisition device according to the dividing line between the target regions acquired by the adjacent image acquisition devices;

and

Step 1068: determining the responsible region of each image acquisition device in the spliced image is according to the acquisition range of each image acquisition device.

Figure 10:
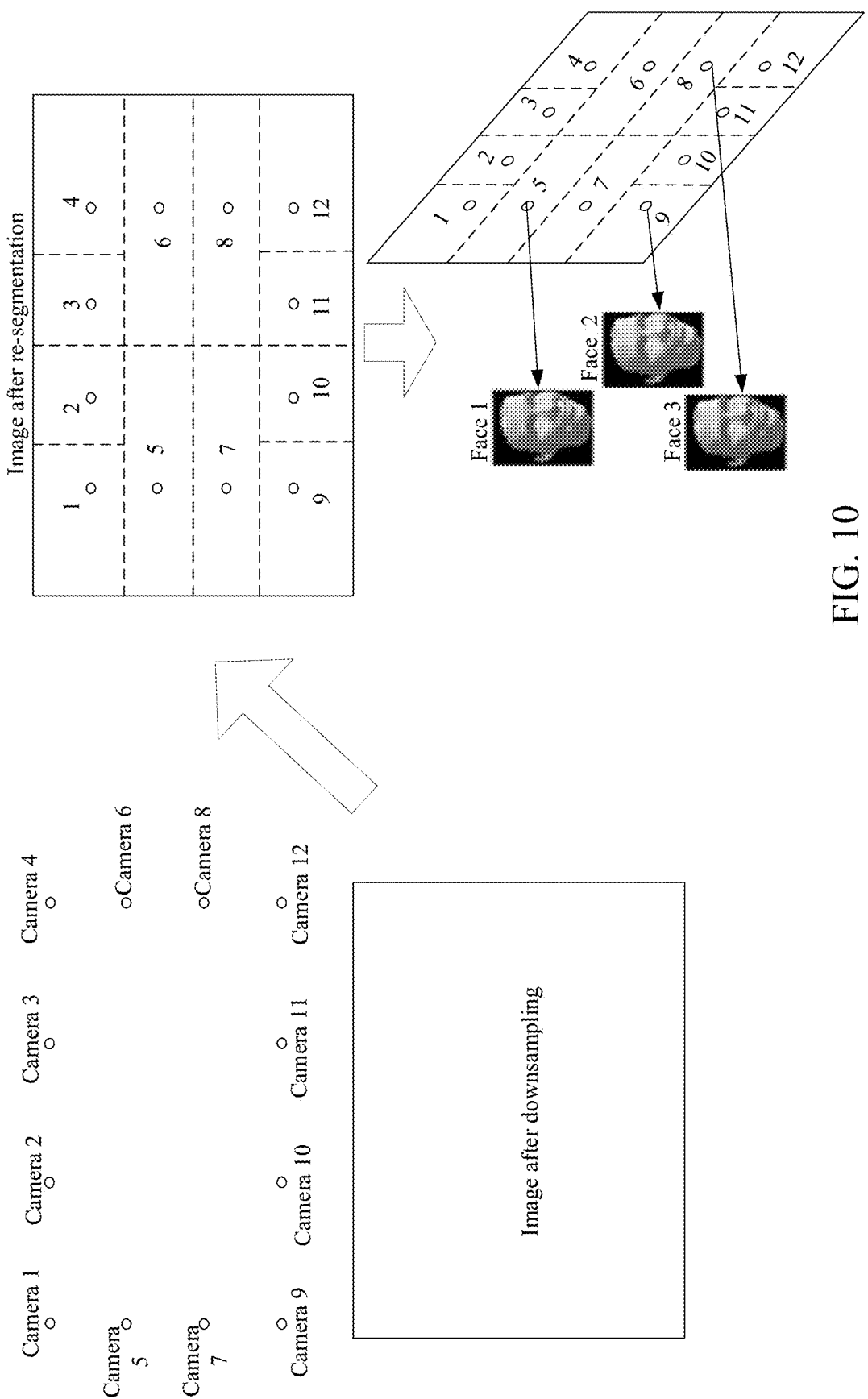
FIG. 10 is a schematic diagram of a principle of re-segmentation of a downsampled spliced image according to an embodiment of the present disclosure.

In this embodiment, the obtained downsampled image is subdivided into camera image regions according to the relative positional relation of each camera. Since the parameters of each camera are the same and they only differ in the coordinates of center positions, at the same shooting distance, each camera has a shooting range of a same size. Therefore, as shown in FIG. 10, the downsampled image is segmented by dividing the image region according to distribution density of the cameras, and the image region corresponding to each camera is calculated as follows:

according to the above method, a shooting range of each camera at distance d is obtained. Assuming that the width*height of an overall shooting range of these 12 RGB cameras at distance d is Wd*Hd, and the four vertex coordinates of the shooting range of each camera are known, for camera 1 and camera 2, a dividing line between camera 1 and camera 2 should be the middle between centers of camera 1 and camera 2. With the center of camera 1 as the origin point and the coordinates of camera 2 as (W/3,0), the dividing line between camera 1 and camera 2 should be (0+W/3)/2=W/6, that is, the dividing line of the shooting range of camera 1 and camera 2 is:

$$X_{1-2} = \frac{W}{3*2};$$

Similarly, for camera 2 and camera 3, the dividing line of shooting range is:

$$X_{2-3} = \frac{2W+W}{3*2};$$

Similarly, for camera 3 and camera 4, the dividing line of shooting range is:

$$X_{3-4} = \frac{2W+3W}{3*2};$$

Similarly, for camera 1 and camera 5, the dividing line of shooting range is:

$$Y_{1-5} = \frac{H}{3*2};$$

Similarly, for camera 5 and camera 6, the dividing line of shooting range is:

$$X_{5-6} = \frac{W}{2};$$

Similarly, the shooting region dividing line of every other two adjacent cameras can be obtained.

By inputting these dividing lines into the overall shooting region, the shooting range of each camera, and proportional relations and positional relations between these ranges and the overall shooting region can be obtained.

By substituting these proportional relations and positional relations into the downsampled image, the responsible region of each camera in the image can be obtained.

Step 20: performing a preliminary face locating on the spliced image, and determining one or more original images corresponding to preliminarily located face positions according to the preliminarily located face positions and the responsible region of each image acquisition device in the spliced image.

In this step, the faces in the downsampled image may be preliminarily located by a face detection algorithm, and the original images (that is, images before the splicing) shot by the corresponding cameras can be determined according to the regions where these faces are located.

Step 30: performing a secondary face locating on one or more determined original images to obtain face pose information and a positional relation of pupils with respect to human eyes, and calculating coordinates of gaze points of the human eyes according to the obtained face pose information and the positional relation of the pupils with respect to the human eyes.

In the embodiment of the present disclosure, because the FOV of each camera is small, high calculation accuracy is achieved in face detection and gaze tracking.

In this embodiment, in step 30 the coordinates of the gaze points of the human eyes on the screen are obtained mainly based on spatial position coordinates and angle coordinates of the face, in combination with the positional relations of the pupils of the human eyes with respect to the center positions of the human eyes.

In an exemplary embodiment, Step 30 includes the following steps:

Step 301: performing face detection in the one or more determined original images to obtain a face region;

Step 302: performing facial landmark detection on the face region to obtain centers of human eye regions;

Step 303: solving a pose of a face in space according to a perspective n point (PnP), to obtain a direction vector of the face, and the pose includes position coordinates and angle coordinates;

Step 304: locating the pupils, calculating movement differences between the pupils and the centers of the human eye regions, and obtaining direction vectors of the pupils with respect to the face according to the calculated movement differences, the direction vectors of the face and diameters of human eyeball;

Step 305: converting the direction vectors of the pupils with respect to the face into direction vectors of the pupils in a world coordinate system; and Step 306: calculating the coordinates of the gaze points of the pupils on a screen according to the direction vectors of the pupils in the world coordinate system.

In this step, face detection is performed again in one or more original images to obtain an accurate region of the face in the current image. Facial landmark detection is performed in the obtained face region to obtain 68 facial landmarks and coordinates of the eye regions. Through PnP algorithm, the pose of face in space is solved, including three position coordinates (abscissa, ordinate and distance coordinates) and three angle coordinates (pitch angle, yaw angle and roll angle). The distributive self-adaptive face detection algorithm can reduce the calculation complexity and improve the calculation accuracy by using the rough locating as the first time and the accurate locating as the second time to calculate the face pose. Since face detection is needed only in some of the cameras instead of all of the cameras, the times of face detection are reduced, the calculation complexity and the resource occupancy rate are reduced accordingly. For example, there are three faces in front of a screen at the same time. 12 times of face detections are required without use of the distributive self-adaptive face detection algorithm, while only 4 times of face detections are required (one downsampled image detection, and 3 times of detections for the subsequent three images) with the method used. In addition, the use of the distributive self-adaptive face detection algorithm can also improve the accuracy of the face detection. Because all camera lenses create certain distortion, the closer the face is to the optical axis of the camera, the higher the accuracy of pose calculation. The distributive self-adaptive face detection algorithm proposed by the embodiment of the present disclosure can assign the roughly located face to the corresponding camera for secondary accurate locating, and the calculated face pose is more accurate with this camera.

In an exemplary embodiment, assuming that a pose of a face in space is (a, b, c, $\alpha$, $\beta$, $\gamma$), where a represents an abscissa, b represents an ordinate, c represents a distance coordinate, $\alpha$ represents a pitch angle, $\beta$ represents a yaw angle, and $\gamma$ represents a roll angle. Taking the center of camera 1 on the upper left of the screen as the origin point of the world coordinate system, with the center coordinates of each camera already given in the above-mentioned image splicing part, as shown in FIG. 10, if three faces simultaneously exist in front of the screen, it is assumed that in step 301, after the secondary accurate locating, an acquired face 1 is in the shooting region of camera 5, face 2 is in the shooting region of camera 9 and face 3 is in the shooting region of camera 8.

The center coordinates of camera 5 are (0, H/3, 0), the center coordinates of camera 9 are (0, H, 0) and the center coordinates of camera 8 are (W, 2H/3,0). In step 303, pose coordinates of face 1 calculated by camera 5 are (x1, y1, z1, $\alpha$1, $\beta$1, $\gamma$1). Pose coordinates of face 2 calculated by camera 9 are (x2, y2, z2, $\alpha$2, $\beta$2, $\gamma$2). Pose coordinates of face 3 calculated by camera 8 are (x3, y3, z3, $\alpha$3, $\beta$3, $\gamma$3).

Figure 11:
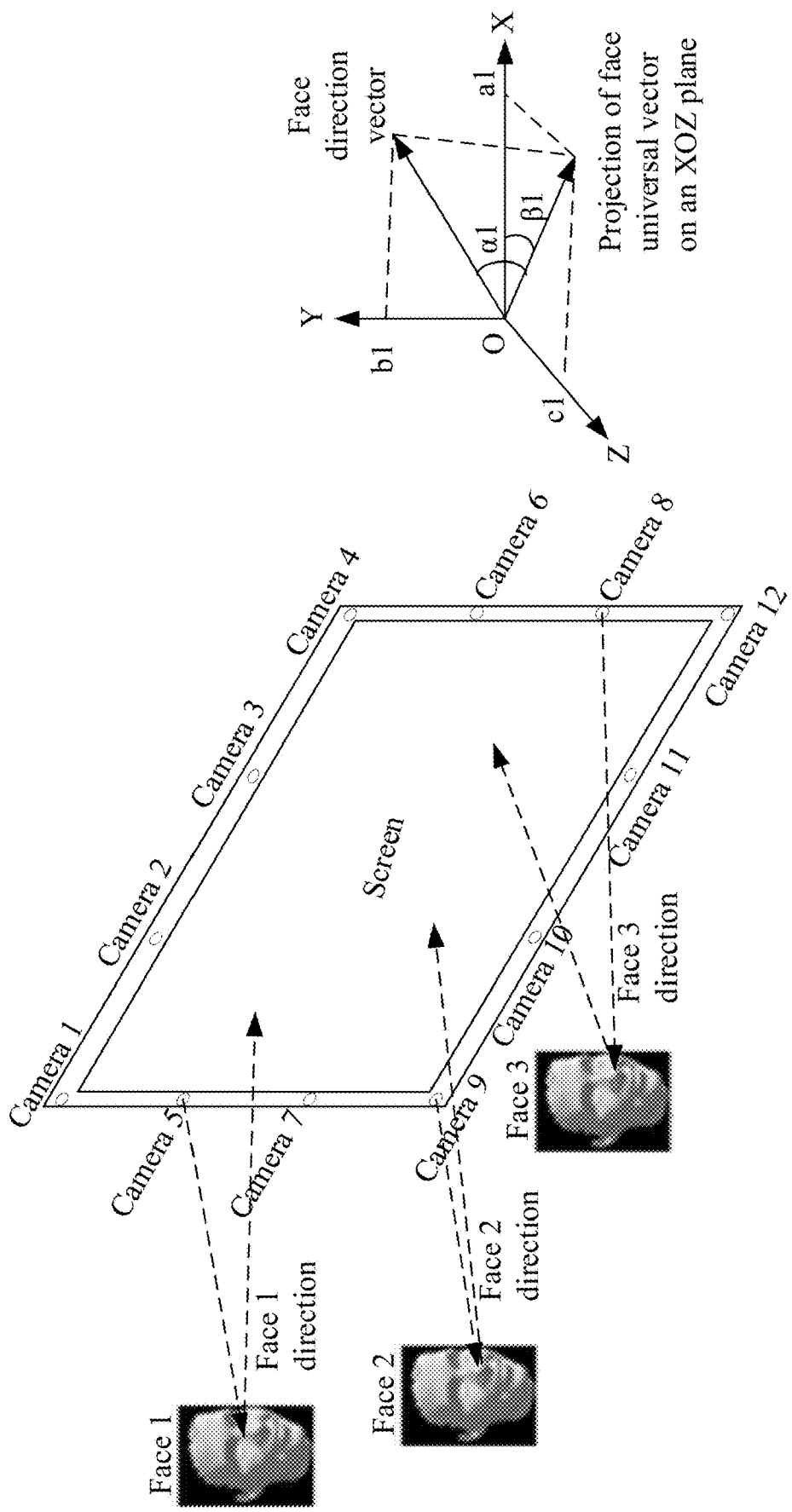
FIG. 11 is a schematic diagram of a principle of solution of a face direction vector according to an embodiment of the present disclosure.

As shown in FIG. 11, the direction vectors of face 1, face 2 and face 3 are calculated respectively, $\alpha$1 and $\beta$1 are configured to represent the pitch angle and yaw angle of the face respectively, and a unit length of face direction vector is 1, as shown in FIG. 11. According to trigonometric function correlation, a1=1*cos ($\alpha$1)*sin($\beta$1); the other two coordinates b1 and c1 can be obtained in the same way, that is, the direction vector (a1, b1, c1) of face 1 can be calculated by the following formula:

$$a1=\cos(\alpha 1)*\sin(\beta 1);$$

$$b1=\sin(\alpha 1);$$

$$c1=\cos(\alpha 1)*\cos(\beta 1);$$

In the same way, the direction vectors of face 2 and face 3 can be calculated.

Figure 12:
FIG. 12 is a schematic diagram of a principle of facial landmark detection according to an embodiment of the present disclosure.

As shown in FIG. 12, in step 302, the coordinates of the human eye regions can be obtained through the facial landmark detection, and then the center coordinates of the human eye regions can be obtained. Taking face 1 as an example, it is assumed that the center coordinates of the left eye region are (XL, YL) and the center coordinates of the right eye region are (XR, YR).

In an exemplary embodiment, in step 304, detection of the pupils can be performed using the gradient vector field method to obtain the pupil coordinates (xL, yL) and (xR, yR) of the left and right eyes at the current time.

The coordinate differences (xL−XL, yL−YL), (xR−XR, yR−YR) between the pupils and the centers of the human eye regions at present are calculated, and ratio values of the differences with respect to the image are KLX=(xL−XL)/640, KLY=(yL−YL)/480, KRX=(xR−XR)/640, and KRY=(yR−YR)/480. Then, the coordinate differences of the pupils moving with respect to the centers of the human eye regions in space are: (KLX*W5, KLY*H5) and (KRX*W5, KRY*H5), wherein W5 and H5 represent the shooting range of the camera 5 at the distance z1.

Figure 13:
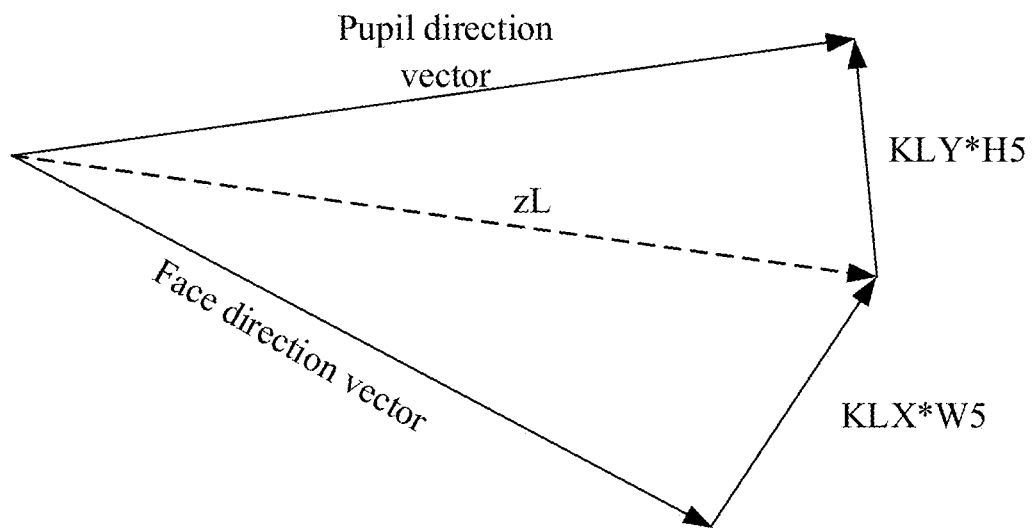
FIG. 13 is a schematic diagram of a principle of a coordinate conversion of pupil direction vector according to an embodiment of the present disclosure.

Taking the left pupil as an example, the pupil direction vector (KLX*W5, KLY*H5, zL) (which is the vector of the pupil in the coordinate system established with the center of the face) can be obtained according to the calculated movement difference of the pupil in space with respect to the center of the human eye region and the diameter of the human eye (taking the diameter of the human eye as an empirical value is 24 mm). As shown in FIG. 13, this vector is a vector with respect to the direction of the face, which needs to be converted into a vector (r1, s1, t1) in the world coordinate system. By calculating a coordinate difference of between the origin point of the coordinate system established with the center of the face and the origin point of the world coordinate system, and by calculating an angle difference between the x-axis, y-axis and z-axis of the two coordinate systems, a conversion formula of the two coordinate systems can be obtained as follows:

$$zL = 12 * \cos\left(2\arccos\left(\frac{\sqrt{12^2 - \frac{(KRY*H5)^2}{124}}}{12}\right)\right);$$

$$q = \frac{1}{\sqrt{(KLX*W5)^2 + (KLY*H5)^2 + 12^2}};$$

Substituting the pupil direction vector obtained above into this conversion formula, the pupil direction vector in the world coordinate system can be obtained as:

$$r1 = a1 + \frac{KLX*W5}{q};$$

$$s1 = b1 + \frac{KLY*H5}{q};$$

$$t1 = c1 + \frac{zL}{q};$$

Because the screen is located on a plane in the world coordinate system, a plane function can be determined by coordinates of the four vertexes of the screen, so that the plane function of the screen can be obtained. The above-mentioned calculated pupil direction vector in the world coordinate system can be used to calculate intersection point coordinates of the eye gaze and the screen using a method of finding intersection point between a straight line and a plane, then the intersection point coordinates EL(Ex1, Ey1) of the pupil direction and the screen are as follows:

$$Ex1 = \frac{z1}{t1}*r1 + x1 + We, \quad Ey1 = \frac{z1}{t1}*s1 + y1 + He;$$

Herein, We is a transverse distance between the center of the human eyeball and the center of the face, and He is the longitudinal distance between the center of the human eyeball and the center of the face. In the present disclosure, both We and He can take empirical values. The obtained EL (Ex1, Ey1) is the coordinates of the gaze point of the left pupil on the screen. In the same way, the coordinates ER of the gaze point of the right pupil on the screen can be obtained.

In an example embodiment, step 30 further includes: calculating an average value of the gaze point coordinates of the left eye and the gaze point coordinates the right eye to obtain final gaze point coordinates.

In this embodiment, after obtaining the coordinates of the two pupils, due to calculation deviation and other causes, the two gaze points do not intersect at one point (they should theoretically intersect at one point if there is no deviation). Therefore, an average value of EL and ER is taken as the final gaze point coordinates.

In the method for tracking eye gaze of the embodiment of the present disclosure, the coordinates of the gaze point on the screen are calculated using the current coordinates and rotation angle of the face in combination with the relative positional relation between the pupil and the human eye. Because the method takes the three pieces of coordinate information and three pieces of angle information of the face into consideration, it also has higher calculation accuracy when the face moves or rotates.

The method for tracking eye gaze of the embodiment of the disclosure does not use a polynomial mapping model, but adopts a method based on face pose and pupil instead, and the eye gaze can be calculated as long as the method is started. A method for tracking eye gaze using a polynomial mapping model needs to calculate parameters of the mapping model first, and because the mapping model parameters corresponding to each person are different, and the corresponding mapping model parameters are also different when the same person uses them at different times. Therefore, after the method for tracking eye gaze using the polynomial mapping model is started, it needs to be calibrated first to calculate the corresponding mapping model parameters of the person at that time. The calculation of eye gaze can be performed only after the calibration is completed. The method for tracking eye gaze according to the embodiment of the present disclosure does not need to calculate the parameters of the mapping model, and the face detection and the calculation of pupil coordinates are carried out in real time, so that no calibration is needed before use, making it more convenient to use.

An embodiment of the present disclosure further provides a processing device, which may include a processor and a memory storing a computer program that is runnable on a processor. The steps of the method for tracking eye gaze described in any of the aforementioned embodiments of the present disclosure are implemented when the computer program is executed on the processor.

Figure 14:
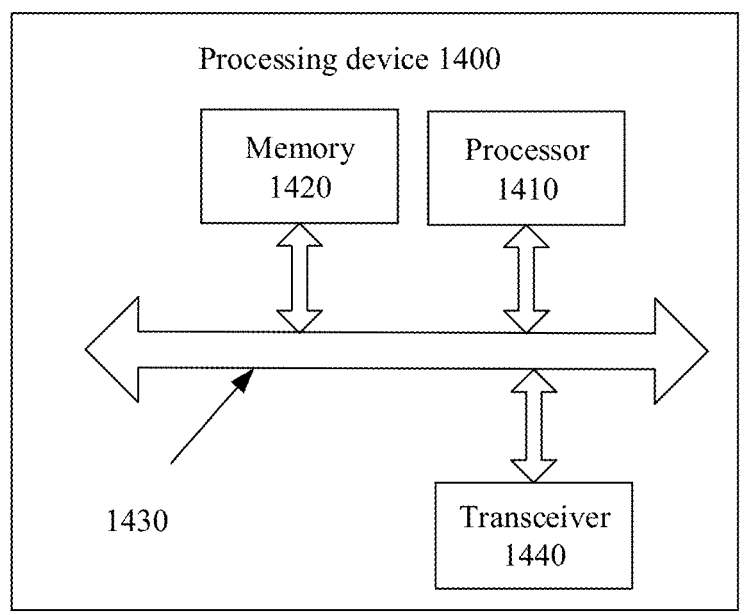
FIG. 14 is a schematic diagram of structure of a processing device according to an embodiment of the present disclosure.

As shown in FIG. 14, in an example, a processing device 1400 may include a processor 1410, a memory 1420, a bus system 1430 and a transceiver 1440, wherein the processor 1410, the memory 1420 and the transceiver 1440 are connected via the bus system 1430, the memory 1420 is configured to store instructions, and the processor 1410 is configured to execute the instructions stored in the memory 1420 to control the transceiver 1440 to send signals. In an exemplary embodiment, the transceiver 1440 may acquire a captured original image from an image acquisition device under the control of the processor 1410, and send a notification to another device through the transceiver after detecting gaze point coordinates of human eyes.

In an exemplary embodiment, the processor 1410 may be a Central Processing Unit (CPU), or the processor 1410 may be another general-purpose processor, a digital signal processor (DSP), an application specific integrated circuit (ASIC), a field programmable gate array (FPGA) or other programmable logic devices, a discrete gate or transistor logic device, a discrete hardware component, etc. The general-purpose processor may be a microprocessor or the processor may be any conventional processor.

The memory 1420 may include a read-only memory and a random access memory, and provides instructions and data to the processor 1410. A portion of the memory 1420 may also include a non-volatile random access memory. For example, the memory 1420 may also store information on device types.

The bus system 1430 may include a power bus, a control bus, a status signal bus, and the like in addition to a data bus. However, for clarity of illustration, various buses are all denoted as the bus system 1430 in FIG. 14.

In an implementation process, the processing performed by the processing device may be completed by an integrated logic circuit of hardware in the processor 1410 or instructions in the form of software. That is, the steps of the method in the embodiments of the present disclosure may be embodied as the execution of hardware processor, or the execution of a combination of hardware in the processor and software modules. The software modules may be located in a storage medium, such as a random access memory, a flash memory, a read-only memory, a programmable read-only memory, an electrically erasable programmable memory, or a register. The storage medium is located in memory 1420, and the processor 1410 reads the information in the memory 1420 and completes the steps of the above method in combination with its hardware. In order to avoid repetition, the detail will not be described here.

An embodiment of the disclosure further provides a gaze tracking system, which includes multiple image acquisition devices and a processing device. The processing device may be the processing device 1400 described in any of the above embodiments. The image acquisition device may be, for example, any device capable of shooting images.

An embodiment of the present disclosure further provides a non-transitory computer readable storage medium, which stores executable instructions. When the executable instructions are executed by a processor, the method for tracking eye gaze described in any of the above embodiments of the present disclosure can be implemented. The method for tracking eye gaze can be used to control the gaze tracking system provided by the above embodiments of the present disclosure to perform detection of gaze points, and can achieve simultaneous gaze tracking of multiple people in a large field of view. Because the method has low occupancy rate of computing resources, high tracking accuracy and speed, and does not need calibration in advance, it has a good application prospect for gaze tracking on large and medium-sized display screens. The method for driving the gaze tracking system to perform gaze tracking by executing executable instructions is substantially the same as the method for tracking eye gaze provided in the above embodiments of the present disclosure, and it will not be described in detail here.

In the description of the present disclosure, it should be understood that an orientation or positional relation indicated by the terms "middle", "upper", "lower", "front", "rear", "vertical", "horizontal", "top", "bottom", "inner", "outer" and the like is based on the orientation or positional relation shown in the accompanying drawings, which is only for the convenience of describing the present disclosure and simplifying the description, rather than indicating or implying that the apparatus or element referred to must have the specific orientation, or be constructed and operated in the specific orientation, and thus cannot be construed as a limitation on the present disclosure.

In the description of embodiments of the present disclosure, unless otherwise explicitly specified and defined, the terms "install", "connect", "couple" should be broadly interpreted, for example, a connection may be a fixed connection or a detachable connection, or an integrated connection; it may be a mechanical connection or an electrical connection; it may be a direct connection, or may be an indirect connection through an intermediary, or may be an internal connection between two elements. Those of ordinary skill in the art can understand the specific meanings of the above mentioned terms in the present disclosure according to specific situations.

Those of ordinary skill in the art may understand that all or some of the steps in the method, the system, and functional modules/units in the device disclosed above may be implemented as software, firmware, hardware, and an appropriate combination thereof. In a hardware implementation, the division between functional modules/units mentioned in the above description does not necessarily correspond to the division of physical components. For example, a physical component may have multiple functions, or a function or a step may be performed by several physical components in cooperation. Some or all of the components may be implemented as software executed by a processor, such as a digital signal processor or a microprocessor, or as implemented hardware, or implemented as an integrated circuit, such as an application specific integrated circuit. Such software may be distributed on a computer readable medium, which may include a computer storage medium (or a non-transitory medium) and a communication medium (or a transitory medium). As is well known to those of ordinary skill in the art, the term "computer storage medium" includes volatile and nonvolatile, removable and non-removable media implemented in any method or technology for storing information (such as computer readable instructions, a data structure, a program module or other data). The computer storage medium includes, but is not limited to, a random access memory (RAM), a read only memory (ROM), an electrically erasable programmable ROM (EEPROM), a flash memory or another memory technology, a compact disc-ROM (CD-ROM), a digital versatile disk (DVD) or another optical disk storage, a magnetic cassette, a magnetic tape, a magnetic disk storage or another magnetic storage device, or any other medium that may be used for storing desired information and may be accessed by a computer. Furthermore, it is well known to those of ordinary skill in the art that the communication medium typically contains computer readable instructions, a data structure, a program module, or other data in a modulated data signal such as a carrier or another transmission mechanism, or the like, and may include any information delivery medium.

Although the embodiments disclosed in the present disclosure are as described above, the described contents are only the embodiments for facilitating understanding of the present disclosure, which are not intended to limit the present disclosure. Any person skilled in the art to which the present disclosure pertains may make any modifications and variations in the form and details of implementation without departing from the spirit and the scope of the present disclosure, but the patent protection scope of the present disclosure shall still be subject to the scope defined by the appended claims.

What is claimed is:

1. A method for tracking eye gaze, comprising:
acquiring original images acquired by a plurality of image acquisition devices, splicing the acquired plurality of original images into one spliced image, and determining a responsible region of each image acquisition device in the spliced image;
performing preliminary face locating on the spliced image, and determining one or more original images corresponding to a preliminarily located face position according to the preliminarily located face position and the responsible region of each image acquisition device in the spliced image; and
performing secondary face locating on the one or more determined original images to obtain face pose information and a positional relation of a pupil with respect to a human eye, and calculating coordinates of a gaze point of the human eye according to the obtained face pose information and the positional relation of the pupil with respect to the human eye.

2. The method for tracking eye gaze according to claim 1, wherein splicing the acquired plurality of original images into the one spliced image comprises:
acquiring a center coordinate, a transverse field angle of view, a longitudinal field angle of view and a resolution of each image acquisition device;
determining a target region acquired by each image acquisition device according to the center coordinate, the transverse field angle of view and the longitudinal field angle of view of each image acquisition device;
determining a non-overlapping region in target regions acquired by adjacent image acquisition devices according to a target region acquired by each image acquisition device;
taking one of the adjacent image acquisition devices as a main acquisition device and the other image acquisition device as an auxiliary acquisition device, converting a non-overlapping region in a target region acquired by the auxiliary acquisition device into a non-overlapping region in an image acquired by the auxiliary acquisition device according to the resolution of each image acquisition device; and
splicing the non-overlapping region in the image acquired by each auxiliary acquisition device onto the image acquired by each main acquisition device to obtain a spliced image.

3. The method for tracking eye gaze according to claim 2, wherein taking one of the adjacent image acquisition devices as the main acquisition device and the other image acquisition device as the auxiliary acquisition device comprises:
when two adjacent image acquisition devices are in a left and right distribution, an image acquisition device on the left is the main acquisition device and an image acquisition device on the right is the auxiliary acquisition device; and
when the two adjacent image acquisition devices are in an up and down distribution, an upper image acquisition device is the main acquisition device and a lower image acquisition device is the auxiliary acquisition device.

4. The method for tracking eye gaze according to claim 1, wherein after the step of splicing the acquired plurality of original images into the spliced image and before the step of determining the responsible region of each image acquisition device in the spliced image, the method further comprises:
performing noise reduction and downsampling on the spliced image.

5. The method for tracking eye gaze according to claim 4, wherein performing the downsampling on the spliced image comprises:
uniformly dividing the spliced image into a plurality of sub-regions according to a resolution of a target image;
calculating the quantity of pixels contained in each sub-region and center coordinates of each sub-region;
calculating a comprehensive pixel value of each sub-region according to distances from all pixels of each sub-region to a center of the sub-region; and
assigning the calculated comprehensive pixel value of each sub-region to the spliced image to obtain a downsampled spliced image.

6. The method for tracking eye gaze according to claim 5, wherein uniformly dividing the spliced image into the plurality of sub-regions according to the resolution of the target image comprises:
uniformly dividing the spliced image into a*b sub-regions, wherein a width of each sub-region is M/a and a height of each sub-region is N/b, wherein a, b, M and N are positive integers, M>a, N>b; a*b is the resolution of the target image, and M*N is a resolution of the spliced image.

7. The method for tracking eye gaze according to claim 1, wherein determining the responsible region of each image acquisition device in the spliced image comprises:
acquiring a target region acquired by each image acquisition device;
determining a dividing line of target regions acquired by adjacent image acquisition devices according to a distribution position of each image acquisition device;
acquiring an acquisition range of each image acquisition device according to the dividing line of the target regions acquired by the adjacent image acquisition devices; and
determining the responsible region of each image acquisition device in the spliced image according to the acquisition range of each image acquisition device.

8. The method for tracking eye gaze according to claim 1, wherein performing the secondary face locating on the one or more determined original images to obtain the face pose information and the positional relation of the pupil with respect to the human eye, and calculating the coordinates of the gaze point of the human eye according to the obtained face pose information and the positional relation of the pupil with respect to the human eye comprises:
performing face detection in the one or more determined original images to obtain a face region;
performing facial landmark detection on the face region to obtain a center of a human eye region;
solving a pose of a face in space to obtain a direction vector of the face, wherein the pose comprises position coordinates and angle coordinates;
locating the pupil, calculating a movement difference between the pupil and the center of the human eye region, and obtaining a direction vector of the pupil with respect to the face according to the calculated movement difference, the direction vector of the face and a diameter of human eyeball;
converting the direction vector of the pupil with respect to the face into a direction vector of the pupil in a world coordinate system; and calculating the coordinates of the gaze point of the pupil on a screen according to the direction vector of the pupil in the world coordinate system.

9. The method for tracking eye gaze according to claim 8, further comprising:
calculating an average value of gaze point coordinates of the left eye and gaze point coordinates of the right eye to obtain final gaze point coordinates.

10. A processing device, which comprises a processor and a memory storing a computer program that is runnable on the processor, wherein a method for tracking eye gaze is implemented when the computer program is executed by the processor, and the method for tracking eye gaze comprises:
acquiring original images acquired by a plurality of image acquisition devices, splicing the acquired plurality of original images into one spliced image, and determining a responsible region of each image acquisition device in the spliced image;
performing preliminary face locating on the spliced image, and determining one or more original images corresponding to a preliminarily located face position according to the preliminarily located face position and the responsible region of each image acquisition device in the spliced image; and
performing secondary face locating on the one or more determined original images to obtain face pose information and a positional relation of a pupil with respect to a human eye, and calculating coordinates of a gaze point of the human eye according to the obtained face pose information and the positional relation of the pupil with respect to the human eye.

11. The processing device according to claim 10, wherein splicing the acquired plurality of original images into one spliced image comprises:
acquiring a central coordinate, a transverse field angle of view, a longitudinal field angle of view and a resolution of each image acquisition device;
determining a target region acquired by each image acquisition device according to the central coordinate, the transverse field angle of view and the longitudinal field angle of view of each image acquisition device;
determining a non-overlapping region in target regions acquired by adjacent image acquisition devices according to a target region acquired by each image acquisition device;
taking one of the adjacent image acquisition devices as a main acquisition device and the other image acquisition device as an auxiliary acquisition device, converting a non-overlapping region in a target region acquired by the auxiliary acquisition device into a non-overlapping region in an image acquired by the auxiliary acquisition device according to the resolution of each image acquisition device; and
splicing the non-overlapping region in the image acquired by each auxiliary acquisition device onto the image acquired by each main acquisition device to obtain a spliced image.

12. The processing device according to claim 11, wherein taking one of the adjacent image acquisition devices as the main acquisition device and the other image acquisition device as the auxiliary acquisition device comprises:
when two adjacent image acquisition devices are in a left and right distribution, an image acquisition device on the left is the main acquisition device and an image acquisition device on the right is the auxiliary acquisition device; and
when the two adjacent image acquisition devices are in an up and down distribution, an upper image acquisition device is the main acquisition device and a lower image acquisition device is the auxiliary acquisition device.

13. The processing device according to claim 10, wherein after the step of splicing the acquired plurality of original images into the spliced image and before the step of determining the responsible region of each image acquisition device in the spliced image, the processor further performs:
performing noise reduction and downsampling on the spliced image.

14. The processing device according to claim 13, wherein performing the downsampling on the spliced image comprises:
uniformly dividing the spliced image into a plurality of sub-regions according to a resolution of a target image;
calculating the quantity of pixels contained in each sub-region and center coordinates of each sub-region;
calculating a comprehensive pixel value of each sub-region according to distances from all pixels of each sub-region to a center of the sub-region; and
assigning the calculated comprehensive pixel value of each sub-region to the spliced image to obtain a down-sampled spliced image.

15. The processing device according to claim 14, wherein uniformly dividing the spliced image into the plurality of sub-regions according to the resolution of the target image comprises:
uniformly dividing the spliced image into a*b sub-regions, wherein a width of each sub-region is M/a and a height of each sub-region is N/b, wherein a, b, M and N are positive integers, M>a, N>b; a*b is the resolution of the target image, and M*N is a resolution of the spliced image.

16. The processing device according to claim 10, wherein determining the responsible region of each image acquisition device in the spliced image comprises:
acquiring a target region acquired by each image acquisition device;
determining a dividing line of target regions acquired by adjacent image acquisition devices according to a distribution position of each image acquisition device;
acquiring an acquisition range of each image acquisition device according to the dividing line of the target regions acquired by the adjacent image acquisition devices; and
determining the responsible region of each image acquisition device in the spliced image according to the acquisition range of each image acquisition device.

17. The processing device according to claim 10, wherein performing the secondary face locating on the one or more determined original images to obtain the face pose information and the positional relation of the pupil with respect to the human eye, and calculating the coordinates of the gaze point of the human eye according to the obtained face pose information and the positional relation of the pupil with respect to the human eye comprises:
performing face detection in the one or more determined original images to obtain a face region;
performing facial landmark detection on the face region to obtain a center of a human eye region;
solving a pose of a face in space to obtain a direction vector of the face, wherein the pose comprises position coordinates and angle coordinates;
locating the pupil, calculating a movement difference between the pupil and the center of the human eye region, and obtaining a direction vector of the pupil with respect to the face according to the calculated movement difference, the direction vector of the face and a diameter of human eyeball;

converting the direction vector of the pupil with respect to the face into a direction vector of the pupil in a world coordinate system; and calculating the coordinates of the gaze point of the pupil on a screen according to the direction vector of the pupil in the world coordinate system.

18. The processing device according to claim 17, wherein the processor further performs the steps of:

calculating an average value of gaze point coordinates of the left eye and gaze point coordinates of the right eye to obtain final gaze point coordinates.

19. A gaze tracking system, comprising: a plurality of image acquisition devices, and the processing device according to claim 10.

20. A non-transitory computer readable storage medium storing computer-executable instructions, which is used for executing a method for tracking eye gaze comprising:

acquiring original images acquired by a plurality of image acquisition devices, splicing the acquired plurality of original images into one spliced image, and determining a responsible region of each image acquisition device in the spliced image;

performing preliminary face locating on the spliced image, and determining one or more original images corresponding to a preliminarily located face position according to the preliminarily located face position and the responsible region of each image acquisition device in the spliced image; and performing secondary face locating on the one or more determined original images to obtain face pose information and a positional relation of a pupil with respect to a human eye, and calculating coordinates of a gaze point of the human eye according to the obtained face pose information and the positional relation of the pupil with respect to the human eye.

* * * * *